E. R. DRAVER.
SHOCK ABSORBER FOR CANTALIVER SPRINGS.
APPLICATION FILED JAN. 5, 1916.
1,216,421. Patented Feb. 20, 1917.
2 SHEETS—SHEET 1.
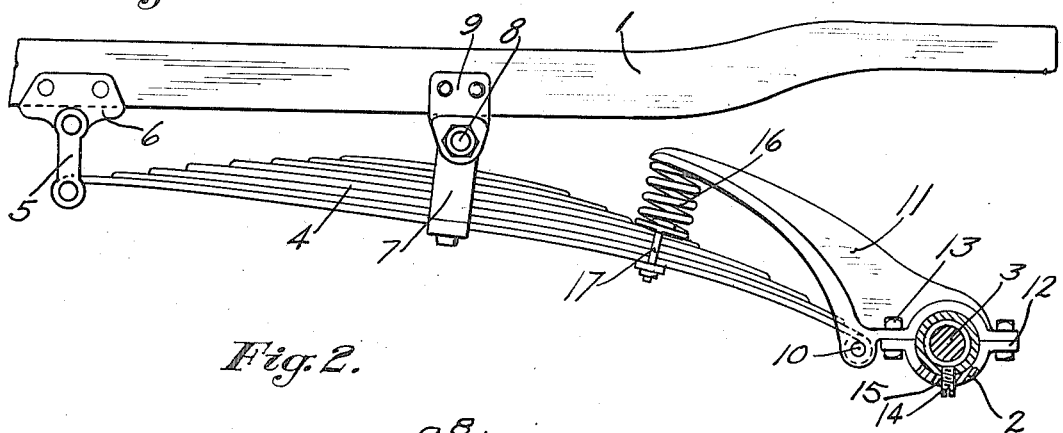
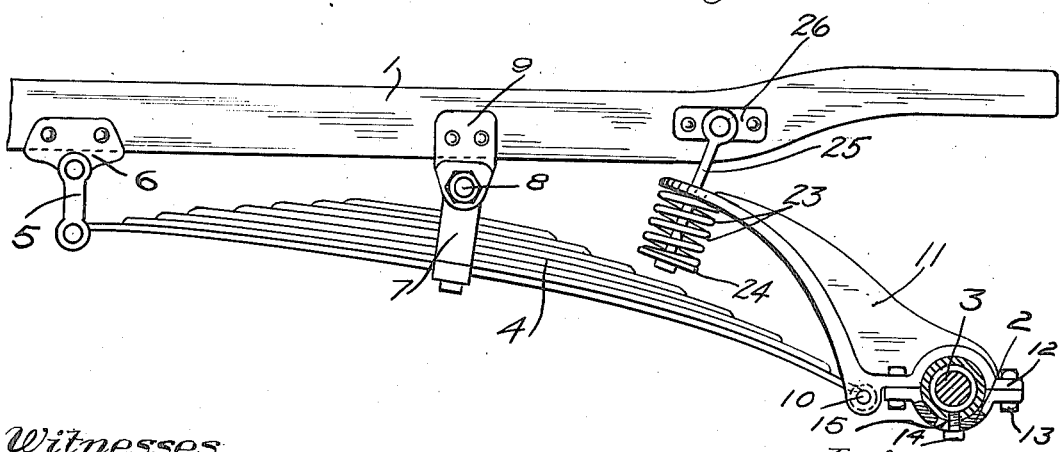
Witnesses
E. C. Skinkle
G. F. Williamson
Inventor
Emil R. Draver
By his Attorneys
Williamson Merchant E. R. DRAVER.
SHOCK ABSORBER FOR CANTALIVER SPRINGS.
APPLICATION FILED JAN. 5, 1916.
1,216,421.
Patented Feb. 20, 1917.
2 SHEETS—SHEET 2.
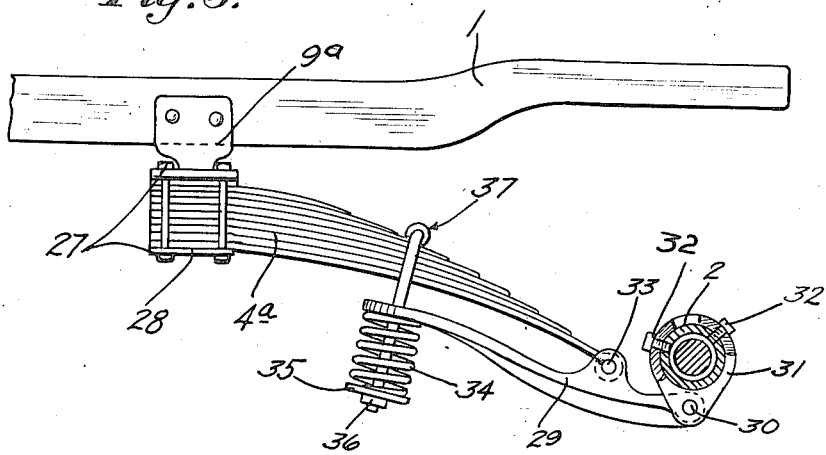
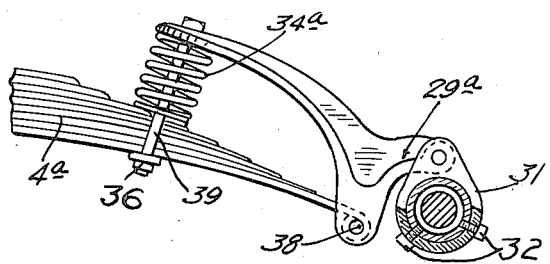
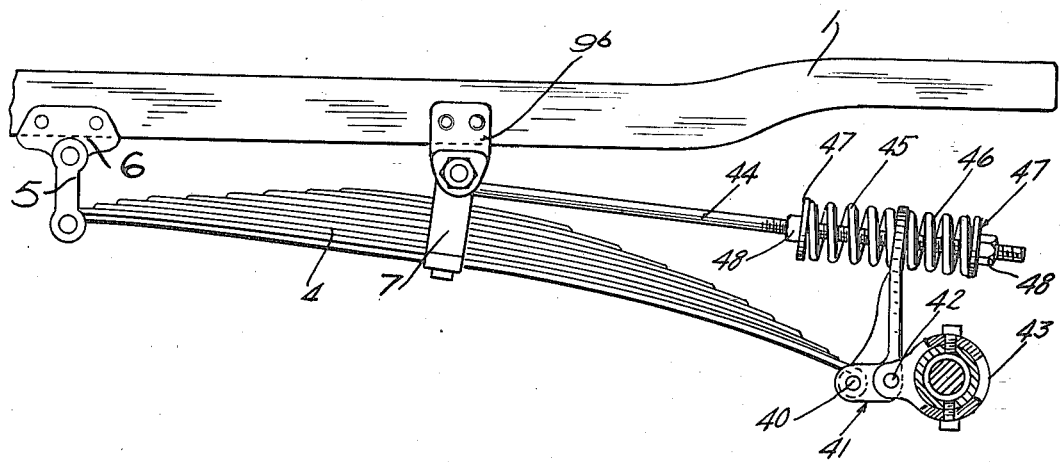
Witnesses
E. C. Skinkle
G. F. Williamson
Inventor
Emil R. Draver
By his Attorneys
Williamson Merchant

UNITED STATES PATENT OFFICE.

EMIL R. DRAVER, OF RICHMOND, INDIANA.

SHOCK-ABSORBER FOR CANTALIVER-SPRINGS.

1,216,421.　　　　Specification of Letters Patent.　　Patented Feb. 20, 1917.

Application filed January 5, 1916. Serial No. 70,412.

*To all whom it may concern:*

Be it known that I, EMIL R. DRAVER, a citizen of the United States, residing at Richmond, in the county of Wayne and State of Indiana, have invented certain new and useful Improvements in Shock-Absorbers for Cantaliver-Springs; and I do hereby declare the following to be a full, clear, and exact description of the invention, such as will enable others skilled in the art to which it appertains to make and use the same.

My present invention has for its object to provide a simple and highly efficient shock absorber for cantaliver springs; and to such ends, generally stated, the invention consists of the novel devices and combinations of devices hereinafter described and defined in the claims.

The manner in which cantaliver springs are now extensively used as the rear springs of automobiles and the advantages resulting from the use of this type of springs, are well known. Shock absorbers of the various types used in connection with elliptical and semi-elliptical springs cannot be applied with the same advantages to cantaliver springs. My invention provides an extremely simple and highly efficient shock absorber that is especially adapted for application to, or in connection with, cantaliver springs where the latter are applied between the body frame and rear axle of the automobile.

Several forms of the invention are illustrated in the accompanying drawings wherein like characters indicate like parts through out the several views.

Referring to the drawings:

Figure 1 is a view chiefly in side elevation, but with some parts sectioned and some parts broken away, showing a simple and efficient way of connecting the shock absorber between the axle casing and rear ends of the cantaliver springs of an automobile;

Fig. 2 is a view corresponding to Fig. 1, but illustrating a modified arrangement;

Fig. 3 is a detail in side elevation, with some parts sectioned, of certain of the parts shown in Fig. 2;

Fig. 4 is a view corresponding to Fig. 1 but illustrating a further modification of the invention;

Fig. 5 is a view corresponding to Fig. 1 but illustrating a still further modification of the invention;

Fig. 6 is a side elevation with some parts sectioned and some parts broken away, illustrating a still further modification; and Fig. 7 is a view corresponding to Fig. 1, but illustrating a further modification of the invention.

In all of the views, the body frame is indicated by the numeral 1, the rear axle casing by the numeral 2, and the rear axle shaft by the numeral 3.

Referring first to the construction illustrated in Fig. 1, the numeral 4 indicates a semi-elliptical cantaliver spring, the front end of which is connected to the depending end of a short link 5, the upper end of which is pivoted to a bearing 6 on the frame 1; and the numeral 7 indicates a bracket which clamps together the intermediate portions of the leaves of the springs 4, and at its upper portion, is pivotally connected by a bolt 8 to a bearing 9 on the overlying portion of the frame 1. In the usual cantaliver spring construction, the rear ends of the springs 4 would be pivotally connected to the rear axle housing, either directly or indirectly, but usually through a hanger bracket or stirrup.

In accordance with my invention, as illustrated in Fig. 1, the rear end of the cantaliver spring 4 is pivotally connected at 10, to the intermediate portion of a shock absorber lever 11, the rear and relatively short end of which is pivoted on the rear axle housing 2 for oscillatory movements. As shown, this pivotal connection between the lever 11 and housing is made by a split or divided bearing 12, the upper half of which is integral with the said lever, and the lower half of which is detachably secured to the lever, preferably by nut-equipped bolts 13. The lever is held against lateral shifting movements, and its oscillatory movements are preferably limited, by a screw or other stop projection 14 secured to and depending from the housing and working in a segmental slot 15 in the lower half of the said divided bearing.

A coiled shock absorbing spring 16, which acts in compression, is compressed between the front end of the lever 11 and the intermediate portion of the rear half section of the cantaliver spring 4, being, as shown, anchored to said spring 4, at its lower end, by a suitable nut-equipped clamping yoke 17. With this arrangement, the weight of the load transmitted from the frame 1 to the rear axle housing, through the cantaliver spring 4 and lever 11, yieldingly pressed downward on the front end of the said lever and compresses the spring 16 between the front end of the said lever and the underlying portion of the said cantaliver spring. The spring 16 is capable of quicker action than the cantaliver spring, and hence, is better adapted to take up short rapidly repeated shocks or vibrations, such as produced in traveling roads having numerous small obstructions. The cantaliver springs, on the other hand, take up the more intense shocks, such as produced by passing over large obstructions in the road, or through chuck holes of considerable size. The two springs 4 and 16 have the relation of main and auxiliary springs, and both act together on rough roads, the action of the one predominating at certain times, and the action of the other at other times, according to the nature of the shocks to be cushioned; but at all times, both of the said springs are active to at least some extent.

The construction illustrated in Figs. 2 and 3 is like that illustrated in Fig. 1, except in the manner of the application of the shock absorbing or auxiliary spring. In this instance, a coiled spring 18 corresponding to the spring 16 is interposed between the front end of the lever and the cantaliver spring 4, and a similar spring 19 is placed on top of the front end of the said lever 11, and is compressed between the said spring and a washer or head 20. This washer 20 is anchored to the upper end of a bolt 21, the lower end of which has a head 22 that is pivotally connected to a coiled end of one of the intermediate leaves of the spring 4 (see Fig. 3) and affords a bearing in the lower end of the spring 18. In this arrangement, the spring 18 acts like the spring 16, but the spring 19 cushions recoil of the spring.

The construction illustrated in Fig. 4 is like that illustrated in Fig. 1, except in the arrangement of the shock absorbing or auxiliary spring 23, which, in this instance, is compressed between the front end of the lever 11 and an underlying head 24 carried at the lower end of a hanger rod 25 that is passed upward through a perforation in said lever 11 and is pivoted to a bearing 26 on the rear portion of the body frame 1. In this arrangement, the spring 23 is not compressed against the cantaliver spring but is independently supported from the main frame, and coöperating therewith, nevertheless, by reinforcing the same and absorbing to a great extent the short and rapidly repeated shocks.

In the several modifications above described, the shock absorber lever has been illustrated as located above the cantaliver spring, but in the construction illustrated in Fig. 5, it is located below the same, and the said cantaliver spring, instead of being of the semi-elliptical type, as illustrated above, is a quarter-elliptical spring, the front end of which is rigidly secured by coöperating bolts 27 and clamping plates 28, to a bearing 9ª located on the frame 1. The lever 29, at its rear end, is pivoted at 30 to the laterally spaced depending ears of an anchor sleeve 31 that is rigidly secured by set screws 32, or otherwise, to the rear axle housing 2. The rear end of the said cantaliver spring 4ª is pivotally connected at 33 to laterally spaced lugs on the lever 29, and the shock absorbing or auxiliary coiled spring 34 is compressed between the front end of the said lever 29 and an underlying head 35 carried at the lower end of a hanger rod 36, the upper end of which is pivotally connected to a coiled end of one of the intermediate leaves of the said cantaliver spring.

The construction illustrated in Fig. 6 is like that illustrated in Fig. 5, except that the sleeve 31, has its ears turned upward and pivotally connected to the rear end of a lever 29ª, which is like the lever 29, except that it is placed above the spring 4ª and has depending laterally spaced lugs to which the rear end of the said spring 4ª is pivotally connected at 38. In this arrangement, the spring 34ª is compressed between the spring 4ª and the overlying upper end of the lever 29ª, and a bolt 39 secured to the said spring 4ª is passed axially through the spring 34ª and through a perforation in the end of the lever 29ª.

The form of cantaliver spring illustrated in Fig. 7 is like that illustrated in Figs. 1 to 4, inclusive, but the rear end thereof is pivotally connected at 40, to the short forwardly projecting arms of a bell crank lever 41, the elbow of which is pivoted at 42 to forwardly projected ears of a sleeve 43 that surrounds the rear axle housing and is rigidly secured thereto by set screws, or otherwise. A thrust rod 44 is pivoted to the bearing 29ᵇ and is passed loosely through a perforation in the upwardly projected relatively long arms of the bell crank 41. Coiled springs 45 and 46 surround the threaded rear end of the thrust rod 44, respectively, in front and at the rear of the upper arms of said bell crank and are compressed between the same and washers 47 adjustably anchored to the said thrust rod by nuts 48. In this arrangement, the spring 45 coöperates with the cantaliver spring 4 in carrying the load and resisting direct shocks, while the spring 46 cushions the recoil.

The several modifications illustrated, make it clear that the invention is capable of a wide range of modification. They all, however, involve this common novel feature, to wit, that the load carried by the cantaliver spring is transmitted to the rear axle housing or rear axle structure, through a shock absorbing lever or rocker that is sustained or held by an auxiliary or shock absorbing spring arranged to reinforce the cantaliver spring and coöperates therewith in the shock absorbing actions.

What I claim is:

1. The combination with the body frame and rear axle structure of a vehicle, of a cantaliver spring anchored to said frame with its free end projecting rearward, a lever connected to the rear end of said spring and the said rear axle structure, constituting a connection between said spring and rear axle structure and mounted for oscillatory movements in the plane of said spring and at a right angle to the axis of said rear axle structure, and an auxiliary shock absorbing spring yieldingly pressing said lever and coöperating with said cantaliver spring in the load carrying and shock absorbing actions.

2. The combination with the body frame and rear axle structure of a vehicle, of a cantaliver spring anchored to said frame with its free end projecting rearward, a lever connected to the rear end of said spring and the said rear axle structure, constituting a connection between said spring and rear axle structure and mounted for oscillatory movements in the plane of said spring and at a right angle to the axis of said rear axle structure, the free end of said lever overlying said cantaliver spring and a coiled auxiliary spring compressed between the front end of said lever and the rear intermediate portion of said cantaliver spring.

In testimony whereof I affix my signature in presence of two witnesses.

EMIL R. DRAVER.

Witnesses:
HENRY C. DRAVER,
EDGAR W. MAURKATTO.